(12) United States Patent
Kolesov et al.

(10) Patent No.: US 10,348,893 B2
(45) Date of Patent: *Jul. 9, 2019

(54) SYSTEM TO DEPLOY A DISASTER-PROOF GEOGRAPHICALLY-DISTRIBUTED CALL CENTER

(71) Applicant: GENESYS TELECOMMUNICATIONS LABORATORIES, INC., Daly City, CA (US)

(72) Inventors: Victor Kolesov, Cupertino, CA (US); Bernard Bretherton, Phoenix, AZ (US); Galina Kovalenko, Walnut Creek, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/853,088

(22) Filed: Dec. 22, 2017

(65) Prior Publication Data
US 2018/0115642 A1  Apr. 26, 2018

Related U.S. Application Data

(63) Continuation of application No. 14/875,252, filed on Oct. 5, 2015, now Pat. No. 9,854,094, which is a
(Continued)

(51) Int. Cl.
*H04M 3/51* (2006.01)
*H04L 29/06* (2006.01)

(52) U.S. Cl.
CPC ........ *H04M 3/5125* (2013.01); *H04L 65/105* (2013.01); *H04L 65/1006* (2013.01);
(Continued)

(58) Field of Classification Search
USPC .................................................. 379/265.04
See application file for complete search history.

(56) References Cited

U.S. PATENT DOCUMENTS

| 2002/0065885 A1* | 5/2002 | Buonanno | G06Q 10/10 709/205 |
| 2006/0221941 A1* | 10/2006 | Kishinsky | H04M 3/523 370/352 |

(Continued)

OTHER PUBLICATIONS

International Search Report and Written Opinion for Application No. PCT/US2012/058120, dated Dec. 4, 2012, 15 pages.

*Primary Examiner* — Amal S Zenati

(57) ABSTRACT

A redundant Session Initiation Protocol (SIP) call center system has two data centers each having a first and a second SIP server cooperating as a first SIP-server high availability (HA) pair, a set of SW applications executable at each data center, and a plurality of agent stations each comprising a SIP telephone and a computerized appliance executing a desktop application at each agent station. The HA pairs operate as SIP server peers, the agent SIP phones are configured to maintain simultaneous registration with both SIP server peers, and Agent Desktop applications log in to only one SIP server peer, wherein the SIP Server peers collaborate to deliver calls to individual agent SIP phones via the SIP server peer where the agent is logged in, and wherein, upon failure of either data center agent's desktop applications log in to the other data center, allowing the associated agent to continue working.

14 Claims, 3 Drawing Sheets

Related U.S. Application Data continuation of application No. 13/622,118, filed on Sep. 18, 2012, now Pat. No. 9,154,529.

(60) Provisional application No. 61/540,688, filed on Sep. 29, 2011.

(52) U.S. Cl.
CPC .......... *H04L 65/1073* (2013.01); *H04L 65/80* (2013.01); *H04M 3/5175* (2013.01); *H04M 3/5191* (2013.01); *H04M 2203/402* (2013.01)

(56) References Cited

U.S. PATENT DOCUMENTS

| | | | |
|---|---|---|---|
| 2008/0082858 A1* | 4/2008 | Hasegawa | H04L 41/0681 714/3 |
| 2009/0245183 A1* | 10/2009 | Baker | H04L 67/16 370/329 |

* cited by examiner

SYSTEM TO DEPLOY A DISASTER-PROOF GEOGRAPHICALLY-DISTRIBUTED CALL CENTER

CROSS-REFERENCE TO RELATED APPLICATIONS

This application is a continuation of U.S. patent application Ser. No. 14/875,252, filed on Oct. 5, 2015, now U.S. Pat. No. 9,854,094, which is a continuation of U.S. patent application Ser. No. 13/622,118, filed on Sep. 18, 2012, now U.S. Pat. No. 9,154,529, which claims priority to Provisional Patent Application No. 61/540,688, filed Sep. 29, 2011, the contents of which are incorporated herein by reference.

BACKGROUND OF THE INVENTION

1. Field of the Invention

The present invention is in the technical area of network telephony systems.

2. Description of Related Art

Call center technology is generally well-known in the art. It is also well-known that existing systems fail to combine the features of geographical redundancy and non-interruptible operation in case of natural disaster.

Existing solutions known to the inventors fail to combine the features of geographical redundancy and non-interruptible operation in case of natural disaster. Description of existing solutions herein does not necessarily imply that the solutions described are publically known, but may be know only to the Applicants. Some system are known to the inventors that can provide non-interruptible operation if all call center components are located at the same geographical place. Those systems function in high availability mode and ensure that the call center continues to operate if one of the redundant components fails. This requirement to have redundant components in the same location is caused by a need to organize a cluster, which contains redundant components, and to synchronize large amount of data between them. If location with the call center components becomes unavailable, then the call center stops functioning completely.

Other systems known to the inventors allow an enterprise to deploy redundant call center components in different locations. So if one location becomes non operational the call center can continue to operate using the components installed at the other site. In this case the call center becomes non-operational for the duration of a switchover process, which may include time to detect the failure, to redirect incoming calls to the new site and to reconnect all operational agents. This time maybe significant enough to negatively impact the call center business.

What is clearly needed is a solution that allows an enterprise to avoid interruptions in the operation of a distributed call center if any of the facilities where call center components are deployed becomes unavailable.

BRIEF SUMMARY OF THE INVENTION

In an embodiment of the present invention a redundant Session Initiation Protocol (SIP) call center system is provided, comprising a first data center comprising a first and a second SIP server cooperating as a first SIP-server high availability (HA) pair, one as primary and the other as backup, a second data center geographically remote to the first data center, the second data center comprising a third and a fourth SIP server cooperating as a second SIP server high availability (HA) pair, one as primary and the other as backup, a set of SW applications executable at each data center, including a configuration server proxy (CSP), at least one Statistics server, and a Routing server, instantiated as pairs having a primary and a backup at each data center, and a plurality of agent stations each comprising a SIP telephone and a computerized appliance executing a desktop application at each agent station. The two HA pairs operate as SIP server peers, the agent SIP phones are configured to maintain simultaneous registration with both SIP server peers, and Agent Desktop applications log in to only one SIP server peer, wherein the SIP Server peers collaborate to deliver calls to individual agent SIP phones via the SIP server peer where the agent is logged in, and wherein, upon failure of either data center agent's desktop applications log in to the other data center, allowing the associated agent to continue working.

In one embodiment the desktop application at an agent station logs in to the CSP to obtain configuration data for the desktop and an associated agent. Also in one embodiment the desktop application may log in to the statistics server to obtain real-time report data for call center operations.

In another embodiment the statistics servers maintain agent profiles wherein each agent has a preferred log-in data center, such that when an agent logs in, the desktop by default connects and logs in to the server application instance at the agent's preferred site, and wherein, if the desktop is unable to log in initially to Configuration Server Proxy or SIP Server at the preferred site, or if the desktop is subsequently unable to maintain its login to either SIP of a HA pair, the desktop switches over its connection to the associated SIP server peer at the other data center.

In another aspect of the invention a method to provide redundant Session Initiation Protocol (SIP) call center performance is provided, comprising steps of (a) instantiating a first SIP server high availability (HA) pair, one as primary and the other as backup, at a first data center; (b) instantiating a second SIP server HA pair at a second data center geographically remote from the first data center, the HA pairs operating as SIP server peers; (c) instantiating a set of SW applications executable at each data center, including a configuration server proxy (CSP), at least one Statistics server, and a Routing server, instantiated as pairs having a primary and a backup at each data center; (d) configuring agent SIP phones in an agent station set to maintain simultaneous registration with both SIP server peers; (e) configuring Agent Desktop applications executing on computerized appliances at agent stations in the set to log in to only one SIP server peer; (f) delivering calls to individual agent SIP phones via the SIP server peer where the agent is logged in; and (g) in the event of a failure of either data center, logging in by the agent's desktop application, to the other data center, allowing the agent to continue working.

In one embodiment of the method the desktop application at an agent station logs in to the configuration server proxy to obtain configuration data for the desktop and an associated agent. Also in one embodiment an agent's desktop application may log in to the statistics server to obtain real-time report data for call center operations.

In another embodiment the statistics servers maintain agent profiles wherein each agent has a preferred log-in data center, such that when an agent logs in, the desktop by default connects and logs in to the server application instance at the agent's preferred site, and wherein, if the desktop is unable to log in initially to Configuration Server Proxy or SIP Server at the preferred site, or if the desktop is subsequently unable to maintain its login to either SIP of a HA pair, the desktop switches over its connection to the associated SIP server peer at the other data center.

DETAILED DESCRIPTION OF THE INVENTION

The present invention is a session initiation protocol (SIP) business continuity solution having a formal architecture enabled to support geographic redundancy (also known as Disaster Recovery) for deployments that include SIP Servers. The unique solution in embodiments of the invention supports pairs of active sites, and provides site-wise redundancy, as well as local High Availability (HA) at each site.

A proposed architecture in an embodiment of the present invention is based on two fully redundant sites where call center components are deployed. Both sites operate at the same time. Because of this, incoming calls are distributed to both sites and call center agents can connect to the site of their preference. Two key features of this novel solution are synchronized instances of the configuration database available at each site and a call distribution system which functions to locate an agent who is connected to one of the two sites.

The system in an embodiment of the invention is designed to let an agent log in to either of the two sites at any point in time, and to allow the agent to continue working normally through the new site. If the site where an agent is originally connected becomes unavailable, the gent is able to connect to the other site and resume operation as soon as the failure is detected.

If both sites are available at the same time, that is one of the sites has not failed, there is an issue of discovering an agent who should answer the call. An algorithm detects agent availability among agents logged in at the on the site where a call is delivered and to deliver this call to the other site in case if an agent is not found at the first site.

To provide identical operational environment for the agents on both sites an architecture is provided in embodiments of the invention which ensures that all configuration changes made on one site are synchronized to the other.

Figure 1:
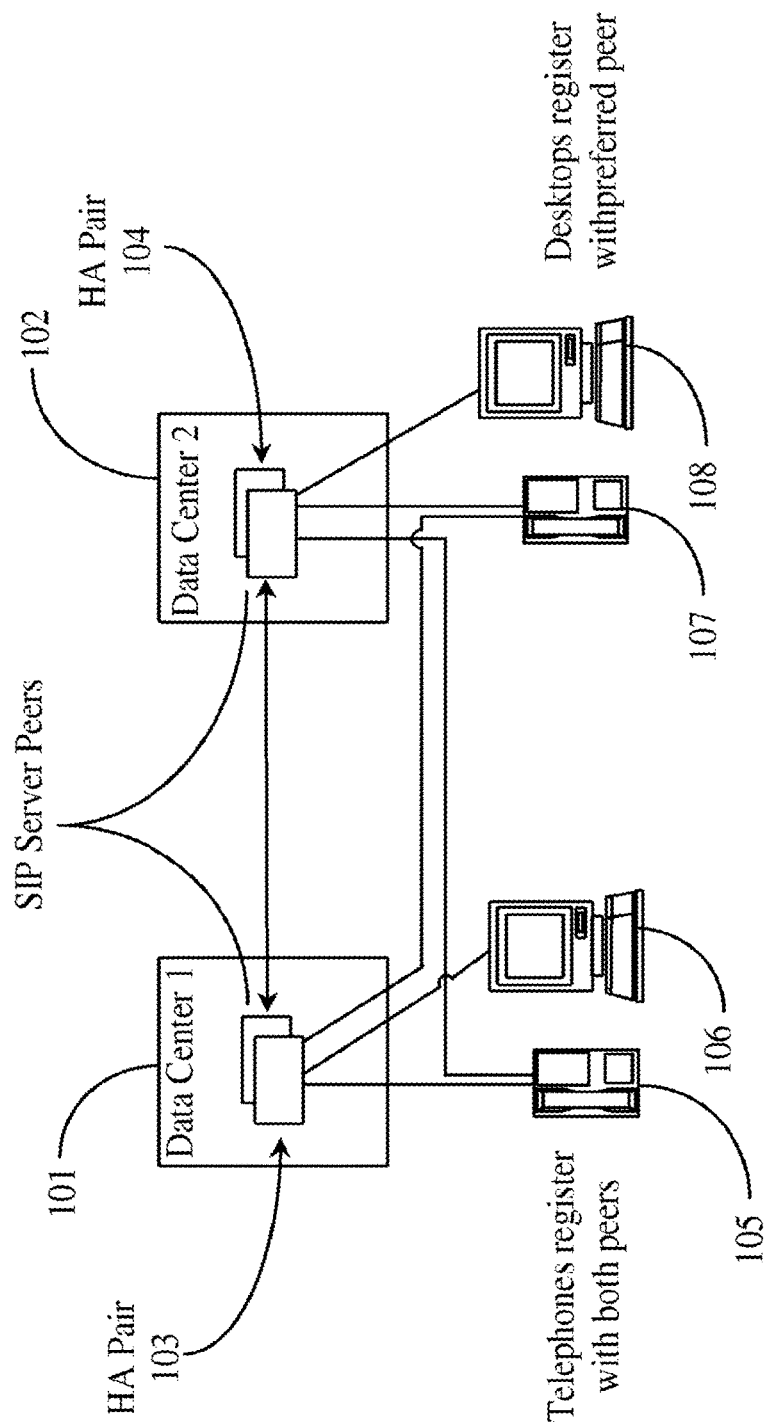
FIG. 1 is an architectural view of two data centers in an embodiment of the present invention.

FIG. 1 is an architectural overview of two data centers 101 and 102 in an embodiment of the present invention. As shown in FIG. 1, SIP business continuity in one embodiment is based on groups of four SIP Servers configured as two HA pairs 103 and 104. In each pair one SIP server is active and one is a backup. The pair at data center 101 and the pair at data center 102 are known to the inventors as SIP Server Peers. The SIP Server Peers collaborate between the data centers to provide Active-Active redundancy between the two sites, with full high-availability (HA) at each site. The solution in this and other embodiments can be scaled upward by adding further groups of SIP Servers.

Agent SIP telephones 105 and 107 represent a plurality of agent telephones which may be active with the two data centers illustrated. Such telephones are configured in embodiments of the invention to maintain simultaneous registration with both SIP Server peers, whereas Agent Desktop applications executing on appliances 106 and 108 maintain a login to only one peer at any given time. The SIP Server peers collaborate to deliver calls to a given agent, including 3PCC (third-party call control) calls and direct-dialed calls, via the peer at which the agent is currently logged in. Outbound 1PCC (first party) calls, can be originated via either peer, but one peer is generally preferred based on phone configuration or DNS SRV priority.

Figure 2:
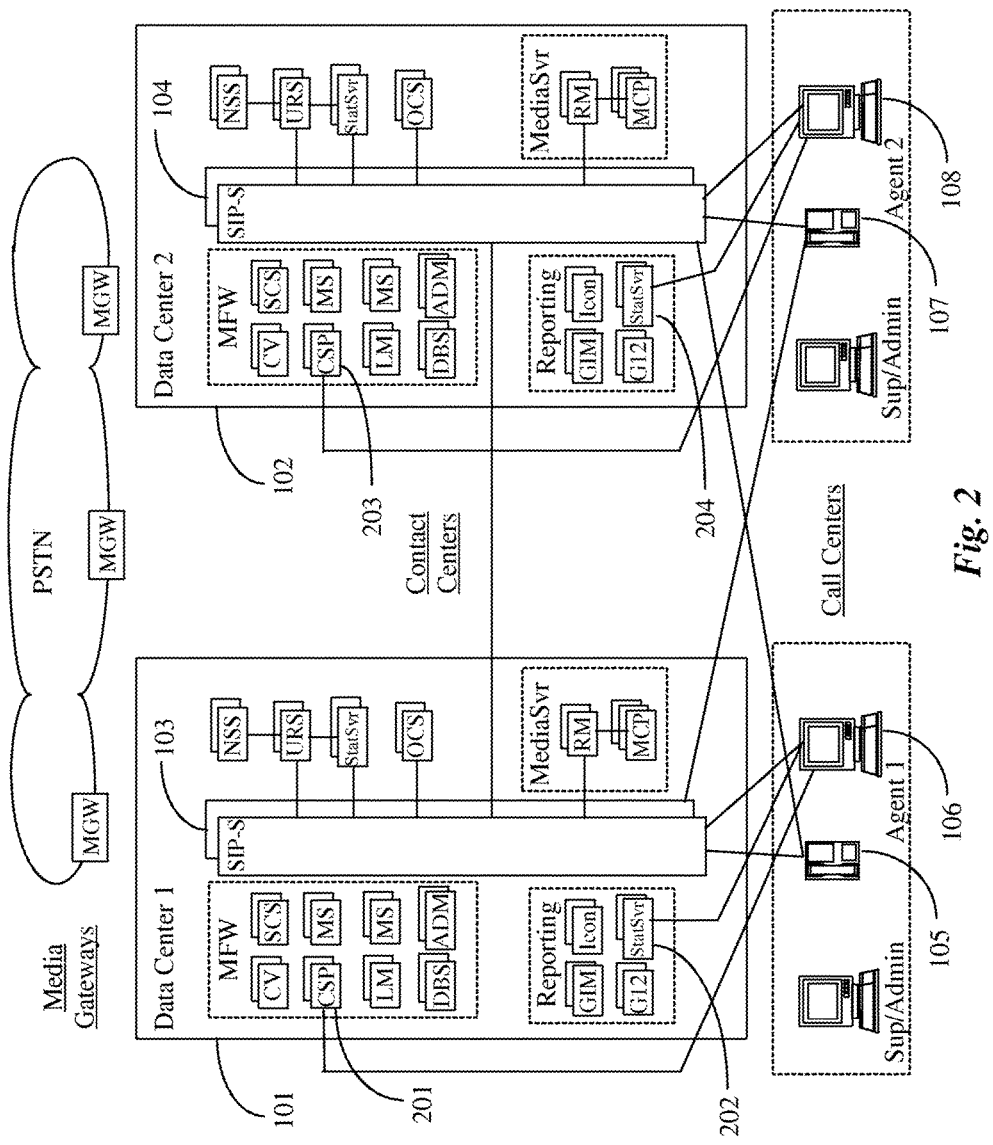
FIG. 2 is an expanded, more detailed representation of the system of FIG. 1.

FIG. 2 is an expanded, more detailed representation of the system of FIG. 1. Data centers 101 and 102 are shown with SIP server pairs 103 and 104 and several instances of software supported functionality as is common in such data centers. The desktop application executing on the desktop associated with an agent may connect to individual ones of these instances for various purposes at the data center where the associated agent is logged in. It should be noted that each SW instance is instantiated in each data center as a primary and a backup pair.

In FIG. 2 the first agent, Agent 1, is shown logged into Data Center 1 (101). The first agent's telephone 105 is configured to maintain simultaneous registration with both data center 101 and data center 102. The first agent's desktop application 106 logs in to only data center 101, and to do so must connect and log in to the Configuration Server Proxy (CSP) 201 to obtain configuration data for the desktop application, and the agent that is logging in. As stated previously, Agent 1's desktop must connect and log in to the SIP Server peers 103 at data center 101 as well. Agent 1's desktop may also optionally connect to StatServer 202 at data center 101 (as shown) to obtain real-time report data.

As shown in FIG. 2, agent 2 logs in to data center 102 and makes similar connection as described for agent 1, one connection to CSP 203, and one to SIP Server 104. Optionally Agent 2s desktop may also contact StatServer 204 for Stat data. Each agent in this embodiment has a preferred site defined in configuration. To provide flexibility of configuration, the preferred site is configurable hierarchically at Tenant, Agent Group, and Person levels.

When an agent logs in, the desktop by default connects and logs in to server application instances (Sip Server, CSP and optionally StatServer) at the agent's preferred site. If the desktop is unable to log in initially to Configuration Server Proxy or SIP Server at the preferred site, or if it is subsequently unable to maintain its login to either server, it switches over its connection to the other site. Throughout this specification, such switchovers may be referred to as Disaster Recovery (DR) switchovers.

In embodiments of the invention all components of the SIP Business Continuity embodiment that support HA, including Configuration Server Proxy, SIP Server and Stat Server, are deployed with local HA at each site. In the event that the primary instance of any of these applications fails, a Management Layer initiates an HA failover of that application to its backup instance. In addition, applications that support Hot Standby High Availability (e.g. SIP Server) employ synchronization (e.g. call state, agent state), between the primary and backup members of an HA pair. This synchronization allows instantaneous recovery following a failure, with zero or minimal loss of stable, in-setup, or new calls.

In the event of a site failure, the time typically taken for all components of the SIP Business Continuity solution to detect and recover from the failure is about 60 seconds in one embodiment. During this time, it is expected that stable and in-setup calls, and some new calls will be lost.

Configuration data described in this specification is exemplary only, and may vary considerably in different embodiments and deployments of the invention.

In some embodiments of the invention two ThirdParty-Application objects may be configured, one for each site. Each AIL Application object may be configured with connections to the primary Configuration Server Proxy, SIP Server and StatServer at the corresponding site. The SIP Server connections may be configured with an ADDP timeout of 20 to 30 seconds. In addition, each AIL Application object may be configured with the following data, which is common to many agent desktops. The data may be placed in a section named agent-desktop of each application object.

site-timeout specifies a timeout interval in seconds after loss of connection to the High Availability (HA) Pair of SIP Servers, before the desktop should initiate a Disaster Recovery switchover. A typical value for this timeout is 30 seconds.

site-sip-register-timeout specifies a time interval in seconds to wait for SIP Phone registration before initiating a DR switchover, after the current SIP Phone connection is lost or its registration has expired. A typical value for this timeout is 30 seconds.

In some embodiments a person object for each agent may be configured with the following data to indicate the preferred site for the agent. The data is be placed in a section named agent-desktop of each person object.

site-1 specifies the name of the AIL Application object corresponding to the site with the highest connection priority for the agent. This site is also referred to as the preferred site.

site-2 specifies the name of the AIL Application object corresponding to the site with the second highest connection priority for the agent.

Data in some embodiments must be available to the desktop to allow it to connect initially to Configuration Server Proxy (CSP) to retrieve the configuration data described above. Depending on customer requirements, this data may be configured individually within each desktop instance, or it might be configured in a local server from which all or most desktops obtain their initial configuration. In order for the desktop to be able to connect to either of the peer sites in the event that one site is down at the time of startup, the specified data items need be configured for both sites.

At a minimum, the following local configuration is to be available to the AIL desktop application:

Primary Config Server Proxy—IP address and port for both sites
Backup Config Server Proxy—IP address and port for both sites
Application name and type for both sites
Place name for both sites It is to be noted that in embodiments of SIP Server Business Continuity where an agent phone has two DNs, a separate place object may be configured and associated with each DN.

In various embodiments, on startup, the desktop application will first connect to the Configuration Server Proxy at one of the sites. Since the preferred site for the agent is not known at this point, this connection can be to either site. If the desktop cannot connect to the first site attempted, it will attempt to connect to the other site.

To connect to Configuration Server Proxy, AIL requires the following parameters:

IP address and port of Config Server Proxy—from local configuration
AIL Application name—from local configuration
Username and password—supplied by agent on logging into the desktop In some embodiments the desktop connects to the Config Server Proxy using the Application name to identify itself, and the user name and password to identify and authenticate the agent.

After connecting to Configuration Server Proxy, the desktop application may obtain the name of the preferred site (site-1) and secondary site (site-2) AIL Application Objects for the agent from configuration data for the agent's Person object. The desktop may then read the configuration for the preferred site AIL Application Object, to obtain the IP address and port number of the preferred Configuration Server Proxy.

If a preferred Configuration Server Proxy for the agent is not the one to which the desktop is currently connected, the desktop will re-connect to the Configuration Server Proxy at the preferred site, according to a DR Switchover procedure.

The desktop application may cache the preferred site information to avoid the possibility of a switchover immediately after startup, however on connecting to Configuration Server Proxy, it should always follow the procedure described above, in case the configuration has changed. Caching should not be used if hotel seating/hot seating is employed.

There are certain procedures that the desktop application shall follow in specific embodiments to detect a failure of the site to which it is currently connected. The desktop application shall follow the same procedures regardless of whether it is currently connected to the preferred site or to the secondary site.

In some embodiments the desktop application may create four listeners:

A telephony service listener
A configuration service listener
A statistic service listener
A listener to the DN of the agent's phone.

The telephony service represents the status of the connection between this application and the primary/backup pair of SIP Servers. If the telephony service goes to status OFF, this indicates that both the primary and the backup SIP Server are unavailable. When and if this occurs, AIL tries to reconnect to the current primary/backup SIP Servers. The retry interval is configured in the constructor for AilLoader. If the telephony service does not return to ON status within the site-timeout interval, the desktop application will treat the condition as a site failure, and initiate a DR switchover. If site-timeout is not configured, or has a value of zero, the desktop should not perform a DR switchover based on the status of the telephony service listener.

The configuration service represents the status of the connection between this application and the primary/backup pair of Configuration Servers. If the configuration service goes to status OFF, this indicates that both the primary and the backup Config Server are unavailable. When this occurs, AIL tries to reconnect to the current primary/backup Config Servers. The retry interval is configured in the constructor for AilLoader. The desktop application monitors the status of the configuration service. In the event that the service becomes unavailable, the desktop warns the user and, if appropriate, generates alarms to upstream monitoring services, but should not initiate a DR switchover based solely on the status of this service.

The statistic service represents the status of the connection between this application and the primary/backup pair of Stat Servers. If the statistic service goes to status OFF, this indicates that both the primary and the backup Stat Server are unavailable. When this occurs, AIL tries to reconnect to the current primary/backup Stat Servers. The retry interval is configured in the constructor for AilLoader.

The desktop application monitors the status of the statistic service. In the event that the service becomes unavailable, the desktop warns the user and, if appropriate, generates alarms to upstream monitoring services, but should not initiate a DR switchover based solely on the status of this service.

In various embodiments the desktop application may utilize a DN Listener to detect EventAgentLogout events from SIP Server. There are several reasons why SIP Server can send EventAgentLogout:

The agent logged out manually. The desktop application should take no further action.

A supervisor forced a logout of the agent. The desktop application should take no further action. Genesys does not define a specific reason code for a supervisor forced logout, but it is recommended that, if possible, the customer's supervisor desktop should assign a suitable reason code, and that the agent desktop should check for that code.

The associated SIP phone registration expired. In this case, the event data will contain the reason code dr-force_logout. If the desktop application does not have an embedded SIP endpoint, it should wait for the external endpoint to re-register. If the desktop application has an embedded SIP endpoint. In either case, an EventDNBackInService event indicates successful re-registration.

If site-sip-register-timeout is configured with a non-zero value, and EventDNBackInService is not received within the time specified by site-sip-register-timeout, the desktop should initiate a DR switchover.

If site-sip-register-timeout is not configured, or has a value of zero, the desktop should not perform a DR switchover based on the dr-force_logout reason code.

SIP Server went into Graceful Shutdown mode. Graceful Shutdown mode is initiated through an Administrator, and allows calls to be purged from SIP Server prior to shutting it down for maintenance purposes. In this case, the event data will contain the reason code graceful_shutdown_logout. The desktop application may initiate a DR switchover.

In specific embodiments, to effect a site switchover, it is necessary to restart AIL with the parameters for the target site. The killFactory( ) function should be used. This allows AIL to be restarted without having to restart the underlying JVM. To minimize the startup time, the option loading/on-demand should be set to true. Once the connection to the other site has been established, the desktop application should set up Telephony Service and DN listeners for that site, as described above.

Additionally in FIG. 2 there is shown a network cloud labeled PSTN in this example, together with media gateways (MGW), which are the routes by which calls come into the data centers. The skilled person will realize that the network may actually be a combination of networks wherein calls of all known sorts may be handles and routed to this and other data centers, including cellular systems, VoIP and others.

Figure 3:
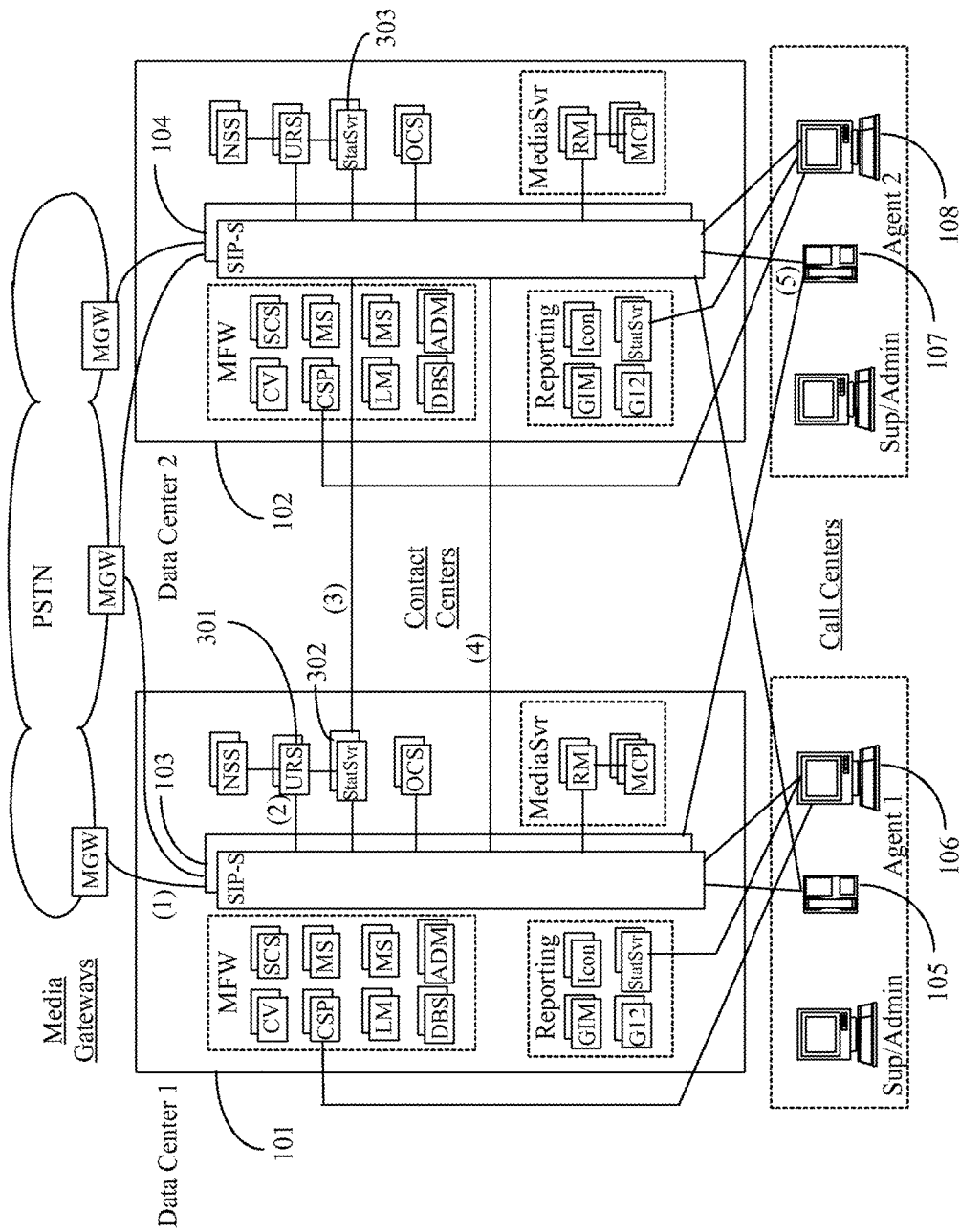
FIG. 3 represents a call flow example in an embodiment of the present invention.

FIG. 3 represents a call flow example in an embodiment of the present invention. As shown in FIG. 3 the media gateways distribute incoming call traffic across both sites. For example a call is shown arriving at Data Center 1 by path (1) to SIP Server pair 103. In regard to this call, SIP server 103 requests routing instruction from Universal Routing Server (URS) 301 on path (2). Now Data Center 1 Stat Server 302 has visibility to agents logged into both SIP Servers by virtue of path (3). Data Center 2 Stat Server 303 has similar capability, but path not shown.

URS 301, by routing rules executing thereon, selects the best agent to handle the call, giving preference to agents logged in to the local SIP Server. In this example, the selected 'best" agent happens to be logged in to Data Center 2 (Agent 107). URS 301 requests SIP Server 103 to route the call to the selected agent. Agent Reservation must be enabled. SIP Server 103 determines that the selected agent is not logged in locally, but is logged in to SIP Server 104 at Data Center 2. SIP Server 103 therefore transfers the call to the Data Center 2 SIP Server 104 by path (4), which delivers the call to the selected Agent, in this case to telephone 107, which is associated with the selected agent, by path (5).

Key features in embodiment of the invention are that all SW instances operating in a data center exist as HA pairs with a primary and a backup, and are synchronized such that detection of a primary failure causes the backup to take over seamlessly. Further, configuration databases at each Data Center are fully synchronized, and call distribution at each site is configured to route calls to agents logged in at either (both) sites. On failure, logged in Agent's desktops log in to the "other" site, where the Agent's telephone (DN) is already registered, and the agent may continue working normally. In some embodiments upon the first site achieving full functionality after failure, Agent's desktops that have logged in the alternate site, may log out and log in again at the original site.

The skilled person will realize that there are, within the spirit and scope of the invention, many variations that might be made to the embodiments described and illustrated in this specification. It is well-known that not every implementation of a data center as shown and described will have exactly the same software instances and functionality. There are further many ways that software may be implemented. Further, procedures described herein may not always be in the same order as described. Such differences are not outside the description of the invention.

The invention claimed is:

1. A redundant Session Initiation Protocol (SIP) call center system comprising:
a first SIP server pair comprising a first and a second SIP server, the second SIP server taking a role of backup to the first SIP server; and
a second SIP server pair geographically remote to the first center SIP server pair, the second data center SIP server pair comprising a third and a fourth SIP server, the fourth SIP server taking a role of backup to the third SIP, wherein the second SIP server pair is redundant to the first SIP server pair and is configured to operate concurrently with the first SIP server pair;
wherein a SIP communication device of a particular agent is configured to be concurrently registered with both the first and second SIP server pairs, and an agent application is configured to transmit data to log-in the particular agent to the first SIP server pair without logging-in the particular agent to the second SIP server pair, wherein the first SIP server pair is configured to route a telephony call to the SIP communication device of the particular agent logged-in to the first SIP server pair, and wherein the agent application is configured to detect failure of both the first and second SIP servers of the first SIP server pair, and transmit data to the second SIP server pair for logging-in the particular agent to the second SIP server pair for continued operation of the particular agent in handling the telephony call.

2. The call center system of claim 1, wherein the agent application is further configured to access a configuration server to obtain configuration data for the particular agent.

3. The call center system of claim 1, wherein the agent application is further configured to log in to a statistics server to obtain real-time report data for call center operations.

4. The call center system of claim 2, wherein the configuration data is identification of a preferred data center, wherein the agent application is configured to identify the first SIP server pair as being hosted at the preferred data center prior to logging-in the particular agent to the first SIP server.

5. A method for providing redundant Session Initiation Protocol (SIP) call center performance, comprising steps of:
 instantiating a first SIP server pair comprising a first and a second SIP server, the second SIP server taking a role of backup to the first SIP server;
 instantiating a second SIP server pair hosted in a geographic location remote from the first SIP server pair, the second SIP server pair comprising a third and a fourth SIP server, the fourth SIP server taking a role of backup to the third SIP server, wherein the second SIP server pair is redundant to the first SIP server pair and operates concurrently with the first SIP server pair;
 concurrently registering a SIP communication device of a particular agent with both the first and second SIP server pairs;
 transmitting, by an agent application, data to log-in the particular agent to the first SIP server pair, without logging-in the particular agent to the second SIP server pair;
 routing, by the first SIP server pair, a telephony call to the SIP communication device of the particular agent logged-in to the first SIP server pair;
 detecting, by the agent application, failure of both the first and second SIP servers of the first SIP server pair; and
 transmitting, by the agent application, data to the second SIP server pair for logging-in the particular agent to the second SIP server pair for continued operation of the particular agent in handling the telephony call.

6. The method of claim 5 further comprising:
 accessing, by the agent application, a configuration server to obtain configuration data for the particular agent.

7. The method of claim 6, wherein the configuration data is identification of a preferred data center, wherein the preferred data center for the particular agent hosts the second SIP server pair, the method further comprising:
 transmitting, by the agent application, data for logging-in the particular agent to the second SIP server pair;
 detecting failure to log-in the agent to the second SIP server pair; and
 in response to detecting the failure, transmitting, by the agent application, the data to log-in the particular agent to the first SIP server pair.

8. The method of claim 5 further comprising:
 detecting, by the agent application, return of functionality of the first and second SIP servers of the first SIP server pair; and
 in response to detecting the return of functionality, transmitting, by the agent application, data to re-log the particular agent to the first SIP server pair.

9. The method of claim 5, wherein the SIP communication device is a SIP telephone.

10. The method of claim 5, wherein the agent application is hosted by a computer device coupled to the SIP telephone.

11. The system of claim 2, wherein the configuration data is identification of a preferred data center, wherein the preferred data center for the particular agent hosts the second SIP server pair, wherein the agent application is configured to transmit data for logging-in the particular agent to the second SIP server pair, wherein in response to failure to log-in the agent to the second SIP server pair, the agent application is configured to transmit the data to log-in the particular agent to the first SIP server pair.

12. The system of claim 1, wherein the agent application is configured to detect return of functionality of the first and second SIP servers of the first SIP server pair, and in response to detecting the return of functionality, the agent application is configured to transmit data to re-log the particular agent to the first SIP server pair.

13. The system of claim 1, wherein the SIP communication device is a SIP telephone.

14. The system of claim 1, wherein the agent application is hosted by a computer device coupled to the SIP telephone.

* * * * *